US009155978B2

(12) United States Patent
Matsuura et al.

(10) Patent No.: US 9,155,978 B2
(45) Date of Patent: Oct. 13, 2015

(54) SOLUTION SEPARATING APPARATUS

(75) Inventors: Kazuo Matsuura, Naruto (JP); Fusatsugu Abe, Naruto (JP); Tetsuo Fukazu, Naruto (JP); Taisuke Sekimoto, Tokyo (JP)

(73) Assignee: ULTRASOUND BREWERY, Tokushima (JP)

( * ) Notice: Subject to any disclaimer, the term of this patent is extended or adjusted under 35 U.S.C. 154(b) by 1257 days.

(21) Appl. No.: 11/990,745

(22) PCT Filed: Aug. 23, 2006

(86) PCT No.: PCT/JP2006/316531

§ 371 (c)(1),
(2), (4) Date: May 7, 2008

(87) PCT Pub. No.: WO2007/023871

PCT Pub. Date: Mar. 1, 2007

(65) Prior Publication Data

US 2009/0050550 A1 Feb. 26, 2009

(30) Foreign Application Priority Data

Aug. 23, 2005 (JP) ................................ 2005-241840

(51) Int. Cl.
*B01D 33/70* (2006.01)
*B01D 3/34* (2006.01)
(Continued)

(52) U.S. Cl.
CPC ................ *B01D 3/346* (2013.01); *B01D 53/04* (2013.01); *B01D 53/261* (2013.01); *B01D 1/16* (2013.01);
(Continued)

(58) Field of Classification Search
CPC ......... B01D 5/0027; B01D 3/001; B01D 3/10
USPC ........ 210/143, 150, 151; 95/95, 96, 116, 117, 95/121
See application file for complete search history.

(56) References Cited

U.S. PATENT DOCUMENTS 4,407,662 A * 10/1983 Ginder ............................ 95/105
5,049,509 A * 9/1991 Szakasits et al. ............ 436/140
(Continued)

FOREIGN PATENT DOCUMENTS

JP 2000-262835 A 9/2000
JP 2001-314724 A 11/2001
(Continued)

OTHER PUBLICATIONS

Japanese Office Action, dated Nov. 29, 2011 for Japanese Application No. 2005-241840.

*Primary Examiner* — Tony G Soohoo
*Assistant Examiner* — Peter Keyworth
(74) *Attorney, Agent, or Firm* — Birch, Stewart, Kolasch & Birch, LLP

(57) ABSTRACT

A very highly concentrated solution is obtained in a single cycle of operation. In the solution separating apparatus, the solution is atomized into the mists to be mixed with the carrier gas, the carrier gas containing such atomized mists is transferred to the collection unit 3, and the collection unit 3 is so constructed and arranged that a specific target substance is separated and collected from the atomized mist component. The solution separating apparatus allows the mist component, by means of the carrier gas, to be in contact with the molecular sieving adsorbent 4 having a molecularly sieving capability of adsorbing the adsorbable component contained in the mist component so as to be separated from the mist component. The non-adsorbable component which is not adsorbed into the molecular sieving adsorbent 4 is separated from the mist component contained in the carrier gas in which the adsorbable component is separated, so that the target substance is separated from the carrier gas.

11 Claims, 7 Drawing Sheets

(51) Int. Cl.

| | |
|---|---|
| ***B01D 53/04*** | (2006.01) |
| ***B01D 53/26*** | (2006.01) |
| *B01D 1/16* | (2006.01) |

(52) U.S. Cl.

CPC ......... *B01D 53/0423* (2013.01); *B01D 53/0438* (2013.01); *B01D 53/0446* (2013.01); *B01D 2253/108* (2013.01); *B01D 2257/80* (2013.01); *B01D 2259/10* (2013.01)

(56) References Cited

U.S. PATENT DOCUMENTS

| | | | | |
|---|---|---|---|---|
| 5,160,707 | A * | 11/1992 | Murray et al. | 422/170 |
| 5,256,173 | A * | 10/1993 | Rastelli | 95/141 |
| 6,010,555 | A * | 1/2000 | Smolarek et al. | 95/98 |
| 6,235,088 | B1 * | 5/2001 | Matsuura | 96/53 |
| 6,322,612 | B1 * | 11/2001 | Sircar et al. | 95/97 |
| 6,706,097 | B2 * | 3/2004 | Zornes | 96/153 |
| 6,723,151 | B2 * | 4/2004 | Tanaka et al. | 95/3 |
| 2004/0094201 | A1 * | 5/2004 | Verma et al. | 137/209 |
| 2004/0194336 | A1 * | 10/2004 | Xu et al. | 34/558 |
| 2004/0260140 | A1 * | 12/2004 | Loezos et al. | 585/951 |
| 2005/0016380 | A1 * | 1/2005 | Matsuura et al. | 96/389 |
| 2006/0048644 | A1 * | 3/2006 | Dolensky et al. | 95/96 |

FOREIGN PATENT DOCUMENTS

| | | | |
|---|---|---|---|
| JP | 2003-164728 | A | 6/2003 |
| JP | 2004-209474 | A | 7/2004 |
| JP | 2005-66553 | A | 3/2005 |

* cited by examiner

SOLUTION SEPARATING APPARATUS

TECHNICAL FIELD

This invention relates to a method and apparatus for separating a highly concentrated solution, which contains a target substance of a high concentration, from a mixture including two or more substances, or for separating a target substance contained in a solution, and particularly pertains to an optimal apparatus for separating alcohol of a higher concentration from an alcohol solution such as biomass alcohol, Sake and Sake raw material, or for separating a solution of a highly concentrated target substance from petroleum.

BACKGROUND ART

In recent years, a fuel is used in which alcohol is added to gasoline, so that there has been an ardent need for a technology of increasing an alcohol concentration. Alcohol can be produced at a lower cost by fermenting an organic material, for example, corn. However, biomass alcohol produced in such a method is of a lower concentration, and such alcohol has to be treated for its higher concentration by separating water content from the alcohol. In order to separate the water content from the alcohol to obtain a higher concentration, there is used a method of distillation. This method, however, suffers a disadvantage that energy consumption becomes larger. When a great amount of energy is consumed in treating alcohol for its higher concentration, it becomes impossible or difficult to reduce total consumption of gasoline even though alcohol-added gasoline is combusted.

The present inventor developed a separating apparatus for increasing an alcohol concentration by way of lower energy consumption (See Patent Document 1).

Patent Document 1: JP-A-2001-314724

In this separating apparatus, an atomization chamber of a closed structure is filled with an alcohol solution, the alcohol solution in this atomization chamber is ultrasonically vibrated by an ultrasonic vibrator to be atomized into mists, and such atomized mists are condensed and collected, so that an alcohol solution of a higher concentration can be separated. This separating apparatus is capable of separating highly concentrated alcohol as a target substance in the following operation.

Alcohol is easier than water to be shifted to the surface of a solution, and the alcohol concentration is higher in the solution at the surface. In this state, when the solution is subjected to an ultrasonic vibration, the highly concentrated alcohol turns to mists to be released into the air in a state of fine particles under the effect of the energy generated by the ultrasonic vibration. The mists released into the air have a higher concentration of alcohol. This is because the solution at its surface side with a higher alcohol concentration is easier to be transformed into the mists. The fact that alcohol is easier to be vaporized than water also accelerates a higher concentration of alcohol in the mists. This is because a greater amount of alcohol is vaporized than water out of the mists of alcohol solution, so that alcohol concentration becomes higher which is contained in a carrier gas. Consequently, when the atomized mists which are contained in the carrier gas and a component which is vaporized from the mists, namely, the mist component are collected from the carrier gas, a highly concentrated alcohol solution is to be separated. In this method, a highly concentrated alcohol solution can be separated without subjecting the solution to heat. For this reason, it is possible to separate a target substance of a high concentration with lower energy consumption. The method also carries the advantage that the target substance can be separated without undergoing deterioration because there is no heating.

DISCLOSURE OF INVENTION

Problems to be Solved by the Invention

However, the above-described separating apparatus suffers the disadvantage that the concentration of the alcohol solution cannot be made very high, for example, in excess of 90%. Therefore, in order to prepare the alcohol concentration in a high level of more than 90% for example, the alcohol solution has to be repeatedly separated in the separating apparatus until reaching a required concentration. However, after repeated separations, such operation suffers the disadvantage that the total consumption of energy becomes greater that much.

The present invention has been made with a view to overcome the above-mentioned shortcomings, and it is the primary object of the invention to provide a solution separating apparatus in which a solution of a very high concentration can be obtained in a single cycle of treatment.

Means to Solve Problems

In the present invention, a solution is atomized into mists to be mixed with a carrier gas, the carrier gas containing the atomized mists is transferred to a collection unit 3, where a specific target substance is separated and collected from the atomized mist component. In separating the solution, the target substance is separated from the carrier gas in an adsorbing process that the mist component is carried by the carrier gas so as to contact a molecular sieving adsorbent 4 having a molecularly sieving capability and separate the adsorbable component from the mist component by allowing the adsorbable component contained in the mist component to be adsorbed into the molecular sieving adsorbent 4; and then in a separating process that non-adsorbable component, having not been adsorbed in the molecular sieving adsorbent 4, is separated from the mist component contained in the carrier gas in which an adsorbable component has been separated in the previous adsorbing process.

In the prevent invention, the solution can be ultrasonically vibrated to be atomized into the mists to be mixed with the carrier gas. In the invention, the solution can also be sprayed through a spray nozzle 15 to be atomized into the mists to be mixed with the carrier gas.

In the present invention, a molecular sieve made up with a synthetic zeolite can be used as a molecular sieving adsorbent 4.

The present invention can be so designed that an original solution is an alcohol solution, that a target substance to be separated is alcohol having a higher concentration than the original solution, that water contained in the mist component is adsorbed as an adsorbable component by means of the molecular sieving adsorbent 4, and that a non-adsorbed component which is not adsorbed in the molecular sieving adsorbent 4 is the alcohol as the target substance. This separating operation can be so arranged that the adsorbing process serves to adsorb the water as the adsorbed component and separate the water from the mist component, while the separating process serves to separate alcohol as the target substance in the non-adsorbable component from the mist component from which the water has been separated.

In the present invention, the non-adsorbable component contained in the mist component from which the adsorbable component has been separated in the adsorbing process can be separated from the carrier gas by allowing the non-adsorbable component to be adsorbed in a second adsorbent 7 in the separating process.

In the present invention, the carrier gas, after being cooled by the cooling unit 19, can be made into contact with the molecular sieving adsorbent 4, so that the adsorbable component may be adsorbed into the molecular sieving adsorbent 4.

The solution separating apparatus of the invention includes an atomization chamber 1 for atomizing the solution into a carrier gas, an atomization mechanism 2 for atomizing the solution into the mists to be mixed with the carrier gas within the atomization chamber 1, and a collection unit 3 for allowing a mist component, atomized by the atomization mechanism 2 and transferred by the carrier gas, to be adsorbed into a molecular sieving adsorbent 4 and separated from the carrier gas. The collection unit 3 includes an adsorption collector 5 and a separation collector 6. The adsorption collector 5 allows an adsorbable component contained in the mist component within the carrier gas to be adsorbed into the molecular sieving adsorbent 4 having a molecularly sieving capability, while the adsorbable component which is adsorbed is released from the molecular sieving adsorbent 4 to be separated from the mist component. The separation collector 6 allows a non-adsorbable component contained in the mist component, which is not adsorbed by the adsorption collector 5, to be separated from the carrier gas containing the mist component which is exhausted from the adsorption collector 5. In the separating apparatus, the adsorbable component in the mist component is adsorbed and separated from the carrier gas at the adsorption collector 5, and also the non-adsorbable component in the mist component is adsorbed and separated at the separation collector 6.

The solution separating apparatus of the invention can be so constructed and arranged that the atomization mechanism 2 includes an ultrasonic vibrator 11 for ultrasonically vibrating the solution in the atomization chamber 1 to be atomized into the mists to be mixed with the carrier gas for dispersion, and an ultrasonic power supply 12, connected to the ultrasonic vibrator 11, for supplying high-frequency electric power to the ultrasonic vibrator 11 to generate an ultrasonic vibration.

The solution separating apparatus of the invention can be so constructed and arranged that the atomization mechanism 2 includes a spray nozzle 15 for spraying the solution into the mists within the atomization chamber 1, and a pressurizing pump 16 for pressuring and supplying the solution to the spray nozzle 15.

The solution separating apparatus of the invention can be so designed that the molecular sieving adsorbent 4 for adsorbing the adsorbable component is a molecular sieve made up of synthetic zeolite.

The solution separating apparatus of the invention can be so designed that the solution is an alcohol solution, and that the molecular sieving adsorbent 4 at the adsorption collector 5 is a molecular sieve for adsorbing water, contained in the mist component, as an adsorbable component.

The solution separating apparatus of the invention is so designed that the separation collector 6 includes a second adsorbent 7 for adsorbing and separating the non-adsorbable component contained in the mist component from which the adsorbable component is separated by the molecular sieving adsorbent 4 at the adsorption collector 5, and thus the second adsorbent 7 is capable of adsorbing the non-adsorbable component to be separated from the carrier gas.

The solution separating apparatus of the invention is so constructed and arranged that the solution is an alcohol solution, that the molecular sieving adsorbent 4 at the adsorption collector 5 is a molecular sieve for adsorbing the water contained in the mist component, as an adsorbable component, and that the second adsorbent 7 at the separation collector 6 serves as an adsorbent for adsorbing the alcohol.

The solution separating apparatus of the invention is so constructed and arranged that the adsorption collector 5 has the molecular sieving adsorbent 4 filled in the sealed chamber 20, while a vacuum pump 22 is connected to the sealed chamber 20 so that the vacuum pump 22 may evacuate the sealed chamber 20 to release the adsorbable component from the molecular sieving adsorbent 4.

The solution separating apparatus of the invention can be so constructed and arranged that the sealed chamber 20 is connected via an on-off valve 21 to the atomization chamber 1, and that when the on-off valve 21 is opened, the carrier gas, containing the mist component, is supplied from the atomization chamber 1 to the sealed chamber 20 to allow the adsorbable component to be adsorbed into the molecular sieving adsorbent 4, and when the on-off valve 21 is closed to evacuate the sealed chamber 20, the mist component is released from the molecular sieving adsorbent 4.

The solution separating apparatus of the invention can be so constructed and arranged that a pair of sealed chambers 20 are filled with the molecular sieving adsorbent 4, and that the pair of sealed chambers 20 are connected via the on-off valves 21 to the atomization chamber 1. In this separating apparatus, one of the on-off valves 21 is opened to supply the carrier gas, containing the mist component, to the sealed chamber 20 to allow the adsorbable component to be adsorbed into the molecular sieving adsorbent 4, while the other of the on-off valves 21 is closed to evacuate the sealed chamber 20 to release the adsorbable component from the molecular sieving adsorbent 4, so that the on-off valves 21 are alternately opened and closed to allow the adsorbable component to be separated from the carrier gas.

In the solution separating apparatus of the invention, the adsorption collector 5 can be equipped with a temperature controller 26. The temperature controller 26 is capable of controlling a temperature in the molecular sieving adsorbent 4 adsorbing the adsorbable component in the carrier gas to be lower than a temperature in the molecular sieving adsorbent 4 releasing the adsorbable component.

Effect of the Invention

The present invention has a feature that a solution of a very high concentration can be obtained in a single cycle of treatment. FIG. 7 diagrammatically shows that the present invention enables an alcohol solution to be of a high solution in a single cycle of treatment. In this Figure, the axis of abscissa depicts a concentration of alcohol solution before treatment, while the axis of ordinate depicts a concentration of alcohol solution after treatment. As is apparent from the diagram, the apparatus of the invention enables an alcohol solution of 40% by weight to be condensed to a high concentration of as much as about 97% by weight in a single cycle of treatment. Although not shown, in the method developed previously by the present inventor as described in Patent Document 1 (JP-A-2001-314724), an alcohol solution of 40% by weight can be condensed to only about 60% by weight in a single cycle of treatment, while an alcohol solution of 60% by weight can be condensed to only about 80% by weight, and yet an alcohol solution of 80% by weight cannot be condensed almost to any further concentration. Consequently, it is apparent from the above result that the apparatus of the present invention is capable of condensing an alcohol solution to a high concentration in a single cycle of treatment. Moreover, when compared with a method of distillation, a feature of remarkably reduced energy consumption can also be realized by the present invention. This is made possible because in the present invention the solution is atomized into the mists to be mixed with the carrier gas, the adsorbable component contained in the atomized mist component is adsorbed and separated into the molecular sieving adsorbent, and the non-adsorbable component which is not adsorbed in the molecular sieving adsorbent is separated from the carrier gas in which the adsorbable component that is adsorbed in and separated from the molecular sieving adsorbent.

BEST MODE FOR CARRYING OUT THE INVENTION

Embodiments in accordance with the present invention shall be described hereinafter in conjunction with the accompanying drawings. It should be noted, however, that the ensuing description of embodiments is merely illustrative of a solution separating method and separating apparatus only to embody technical ideas conceived in the present invention and that the invention shall in no way be limited to the solution separating apparatus as described below.

To add, in the present disclosure, reference numerals corresponding to members shown in the embodiments are affixed to members shown in the “CLAIMS” and “MEANS FOR SOLVING PROBLEMS” in order to facilitate a better understanding of the claims. However, those members shown in the claims shall in no way be specified to those members shown in the embodiments.

The solution separating apparatus of the invention separates a specified solution of a high concentration from a solution containing at least two substances. Although the invention does not specify a solvent or a solute of the solution, water is a main solvent, and besides water, organic solvents such as alcohol can also be used. The solution is for example one of the following items.

(1) biomass alcohol (2) refined Sake, beer, wine, table vinegar, Mirin (sweet Sake used as seasoning), spirits, Japanese ‘Shouchuu’ spirits, brandy, whisky, liquor (3) any solution including a perfume, aromatic component or aroma component such as pinene, linalool, limonene, and polyphenol (4) any solution including an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a substance in which these are combined (5) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a halogen (6) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a hydroxyl group (7) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with an amino group (8) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carbonyl group (9) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a carboxyl group

(10) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a nitro group

(11) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a cyano group

(12) any solution including a substance in which, in an organic compound belonging to any among the alkanes or cyclo-alkanes, which are saturated hydrocarbons, alkenes, cyclo-alkenes, alkynes, which are unsaturated hydrocarbons, or ethers, thioethers or aromatic hydrocarbons, or a combination of these, at least one hydrogen atom or functional radical has been replaced with a mercapto group

(13) any solution containing a substance in which any one or more atoms included in a solution of (4) to (12) as mentioned above has been replaced with a metal ion

(14) any solution containing a substance in which any hydrogen atom, carbon atom or functional radical in a molecule included in a solution of (4) to (12) as mentioned above has been replaced with any molecule among molecules of (4) to (12)

In the present invention, the solution containing two or more substances is sprayed in a state of mists to be mixed with the carrier gas to produce the atomized mist component. For atomization into the mists, the solution is ultrasonically vibrated to be sprayed in a state of mists to be mixed with the carrier gas, or alternatively the solution is sprayed in a state of fine particles from the spray nozzle into the carrier gas. In the mist component sprayed into the carrier gas, a specific adsorbable component is adsorbed into the molecular sieving adsorbent and separated from the carrier gas. The molecular sieving adsorbent is an adsorbent having a molecularly sieving capability of adsorbing the adsorbable component contained in the mist component. In the mist component from which the adsorbable component is separated by the molecular sieving adsorbent, the non-adsorbable component is further separated from the carrier gas.

In the present invention, by way of an example, highly concentrated alcohol is separated from an alcohol solution. In this method, highly concentrated alcohol can be efficiently separated, with water being an adsorbable component which is adsorbed in the molecular sieving adsorbent and with alcohol being a non-adsorbable component which is not adsorbed in the molecular sieving adsorbent. In this method, the alcohol solution is atomized into the mists to be mixed with the carrier gas. In the mist component having been atomized, the water as an adsorbable component is adsorbed in the molecular sieving adsorbent. In the mist component from which the water as the adsorbable component is adsorbed and separated, the concentration of alcohol as the non-adsorbable component becomes higher. In such a state, the highly concentrated alcohol as the non-adsorbable component is separated from the carrier gas. The method of atomizing the solution by means of the ultrasonic vibration is able to obtain highly concentrated alcohol more efficiently. This is because the atomization by means of the ultrasonic vibration can make an alcohol concentration higher in the mists than in the (original) solution.

When undergoing the ultrasonic vibration, one reason why the concentration of contained substance differs between the atomized mists and the residual solution which is not misted is that the rate differs that a substance, contained in the solution, is shifted to the surface to reach a state of surface excess. Because a solution with a stronger property of reaching a state of surface excess will assume a higher surface concentration, when this is ultrasonically vibrated to turn the solution at the surface into the mists for atomization, the mists have a higher concentration of the substance that readily reaches a state of surface excess. Accordingly, when a substance with a strong property of reaching a state of surface excess is collected from the mists, the concentration of such substance becomes higher. Thus, it becomes possible to separate the highly concentrated substance from the solution.

Further, even when the solution is sprayed in a state of mists into the carrier gas by the spray nozzle, the mist component has, for the above-described reason, a concentration of easy-to-be-vaporized component becomes higher than that of the solution. Thus, when the alcohol solution is sprayed into the carrier gas by the spray nozzle, the alcohol concentration in the mist component becomes higher than that of the solution. Furthermore, in the present invention, the mist component atomized from the solution is separated by the molecular sieving adsorbent into the adsorbable component and non-adsorbable component. Therefore, in the present invention, the means to atomize the solution into the mists is not limited to the ultrasonic vibration alone. For example, the solution can also be sprayed from the spray nozzle into the carrier gas in a state of fine particles to be misted.

With alcohol as the solution, an apparatus and method for separating highly concentrated alcohol from the alcohol (solution) will now be shown. However, the present invention does not specify that the solution be alcohol. This is because the mist component having been atomized into the mists can be separated into the adsorbable component and non-adsorbable component by means of the adsorbent.

The separating apparatus shown in FIG. 1 through FIG. 4 includes an atomization chamber 1 for atomizing the solution into the carrier gas, an atomization mechanism 2 for atomizing the solution into the carrier gas present in the atomization chamber 1, a collection unit 3 for collecting the mist component having been atomized from the solution into the mists by means of the atomization mechanism 2, and a blower 8 for transferring, together with the carrier gas, the mist component having been atomized in the atomization chamber 1, into the collection unit 3.

In the atomization mechanism 2 shown in FIG. 1 and FIG. 2, the solution is atomized into the mists by means of an ultrasonic vibration. In the atomization mechanism 2 shown in FIG. 3 and FIG. 4, the solution is pressurized by a pressurizing pump 16 to be supplied to the spray nozzle 15 and is atomized into the mists by being sprayed from the spray nozzle 15.

The atomization mechanism 2 for atomizing the solution into the mists by means of the ultrasonic vibration is an ultrasonic atomizer 10 which ultrasonically vibrates the solution in the atomization chamber 1 to atomize the solution into the mists. The ultrasonic atomizer 10 includes one or a plurality of ultrasonic vibrators 11 for ultrasonically vibrating the solution in the atomization chamber 1 to atomize the solution into the mists, and an ultrasonic power supply 12, connected to the ultrasonic vibrator(s) 11, for supplying a high-frequency electric power to the ultrasonic vibrator 11 to generate the ultrasonic vibration. The apparatus illustrated in the aforementioned Figures is so constructed and arranged that the blower 8 transfers, together with the carrier gas, the mist component which has been atomized from the solution to the mists in the atomization chamber 1, into the collection unit 3. It should be noted, however, that the separating apparatus may also be so structured as to transfer the mists by means of an electrostatic field or an ultrasonic wave, although these means are not shown.

The atomization chamber 1, as illustrated, is connected via a pump 13 to a starting solution tank 14 which stores the solution, so that the solution can be continuously supplied from the starting solution tank 14. In the present apparatus, while the solution is released out of the atomization chamber 1, a solution is replenished from the starting solution tank 14, so that the concentration of the target substance such as alcohol in the solution in the atomization chamber 1 is prevented from being reduced. Further, as indicated by the arrow A in the Figure, it is also possible to exhaust the solution in the atomization chamber 1 to the outside without re-circulating the solution to the starting solution tank 14, so that the concentration of the target substance contained in the starting solution 14 can be prevented from being reduced. However, the atomization chamber can be so arranged as to allow a new solution to be replaced after the concentration of the target substance has decreased. In such a method, the solution is replaced with a new one after a certain period of time, that is, in a batch system.

The solution in the atomization chamber 1 is atomized into the mists by the ultrasonic atomizer 10. In the mists atomized by the ultrasonic atomizer 10, the concentration of the target substance is higher than that of the solution. Therefore, it is possible to separate a highly concentrated solution efficiently by atomizing the solution into the mists by the ultrasonic atomizer 10 and separating and collecting the target substance from the mists.

The solution in the atomization chamber 1 is ultrasonically vibrated by the ultrasonic atomizer 10 to be transformed into the mists of a higher concentration than the solution in the atomization chamber 1, and the mists are dispersed from the solution surface W. When the solution is ultrasonically vibrated, a liquid column P is formed at the solution surface W, and the mists are generated from the surface of the liquid column P. The ultrasonic atomizer 10 shown in FIG. 5 has the ultrasonic vibrator(s) 11 of the ultrasonic atomizer 10 disposed in an upward direction at the bottom of the atomization chamber 1 which is filled with the solution. The ultrasonic vibrator 11 radiates an ultrasonic wave in an upward direction from the bottom toward the solution surface W to ultrasonically vibrate the solution surface W and generate the liquid column P. The ultrasonic vibrator 11 radiates the ultrasonic wave in a vertical direction.

The illustrated ultrasonic atomizer 10 includes a plurality of ultrasonic vibrators 11, and an ultrasonic power supply 12 for ultrasonically vibrating these ultrasonic vibrators 11. The ultrasonic vibrators 11 are secured, in a watertight structure, to the bottom of the atomization chamber 1. In the apparatus in which the solution is ultrasonically vibrated by the plurality of ultrasonic vibrators 11, the solution is atomized into the mists more efficiently.

When heated by the ultrasonic vibrator 11 or the ultrasonic power supply 12, some of the solution tend to be degraded. Such harmful effects by heat can be avoided by forcibly cooling the ultrasonic vibrator 11. In addition, it is preferred that the ultrasonic power supply 12 be also cooled. Although the ultrasonic power supply 12 will not heat the solution directly, the solution may be indirectly heated by the surrounding elements heated by the ultrasonic power supply. As shown in FIG. 5, the ultrasonic vibrator 11 and the ultrasonic power supply 12 can be cooled when a cooling pipe 18 is disposed in a state of being thermally coupled to the vibrator and the power source, that is, when disposed in a state of allowing for contact with the cooling pipe 18. The cooling pipe 18 serves to cool the ultrasonic vibrator 11 and the ultrasonic power supply 12 by means of a liquid cooled by a cooling unit, by means of a coolant, or alternatively by allowing cool water such as underground water or tapped water to flow through.

The atomization mechanism 2 shown in FIG. 3 includes a pressurizing pump 16 for sucking and pressurizing the solution, and a spray nozzle 15 for spraying and atomizing, in a state of mists, the pressurized solution which is supplied from the pressurizing pump 16. The spray nozzle 15 sprays and atomizes the solution in a state of mists to be mixed with the carrier gas in the atomization chamber 1.

The atomization mechanism 2 shown in FIG. 4 includes a spray nozzle 15, and a gas compressing unit 17 for supplying a pressurized carrier gas to the spray nozzle 15. The carrier gas is air or an inert gas. The apparatus in which the carrier gas is the air uses a compressor as the compressing unit 17. The spray nozzle 15 in the atomization mechanism 2 is a two-fluid type nozzle for supplying the solution and the pressurized gas, so that the solution is sprayed in a state of fine mists. The spray nozzle 15 atomizes and sprays the solution in a state of fine mists by means of the pressurized gas supplied from the compressing unit 17.

The mists of the solution atomized in the atomization chamber 1 are flowed into the collection unit 3 by means of the carrier gas. In order for the mists to be flowed into the collection unit 3, the collection unit 3 is connected through a transfer duct 9 to the atomization chamber 1. The separating apparatuses shown in FIG. 2 and FIG. 4 are so structured as to allow the carrier gas to be circulated by the blower 8 between the collection unit 3 and the atomization chamber 1. In these separating apparatuses, the carrier gas is transferred from the atomization chamber 1 to the collection unit 3, and the carrier gas from which the mist component has been separated is re-circulated to the atomization chamber 1. In these separating apparatuses, it is preferred that an inert gas as the carrier gas be filled in the atomization chamber 1 and the collection unit 3. In the apparatus, the inert gas serves to prevent deterioration of the solution in the atomization chamber 1 and collection unit 3. Thus, a highly concentrated solution can be obtained in a state of higher quality. It should be noted, however, that air can also be used as a carrier gas. In addition, the separating apparatus shown in FIG. 1 is so constructed and arranged that the carrier gas transferred from the atomization chamber 1 to the collection unit 3 is released out to the atmosphere, without being again re-circulated to the atomization chamber 1. In these apparatuses, the air is used as the carrier gas.

The collection unit 3 collects the mist component atomized in the atomization chamber 1 by being separated from the carrier gas. The collection unit 3 includes an adsorption collector 5 for collecting, from the carrier gas, the adsorbable component contained in the mist component, and a separation collector 6 for separating, from the mist component, the non-adsorbable component contained in the mist component but not adsorbed in the adsorption collector 5. Further, the collection unit 3 respectively shown in FIG. 1 and FIG. 3 includes a cooling unit 19 for cooling the carrier gas supplied to the adsorption collector 5.

The cooling unit 19 cools the carrier gas containing the mist component to improve adsorption efficient by the adsorbent. The cooling unit 19 also condenses the mists contained in the carrier gas and collects a higher concentration of alcohol solution than the (original) solution. The alcohol solution collected in the cooling unit 19 has a higher concentration than the (original) solution, but has a lower concentration than the alcohol solution collected in the separation collector 6. For example, when an alcohol concentration in the (original) solution is 40-80% by weight, the concentration of the alcohol solution collected in the cooling unit 19 is about 55% by weight to about 85% by weight. The concentration of the alcohol solution collected in the separation collector 6 as will be described hereinafter in detail reaches a very high concentration of more than 97% by weight when the alcohol concentration of the (original) solution is 40-80% by weight.

The illustrated cooling unit 19 incorporates, in a chamber of a closed structure, a cooler 38 for cooling the carrier gas and the mists. The illustrated cooler 38 is a heat exchanger having a fin (not shown) fixedly secured to the heat exchange pipe. The cooler 38 cools a cooling coolant and cooled water by circulation in the heat exchange pipe. However, the cooler may also be an electronic cooler equipped with Peltier element or the like. A portion of the mist component atomized in the atomization chamber 1 is dewed and condensed in the cooler 38, for collection. The carrier gas containing the mist component cooled by the cooling unit 19 is transferred to the adsorption collector 5. Since the mist is not a gas, the mist can be collected by being condensed without necessarily being cooled. However, when the mist is cooled, the mist can be collected quickly enough.

In the adsorption collector 5, the water, which is an adsorbable component contained in the carrier gas and mist component having been cooled in the cooling unit 19, is separated by being adsorbed into the molecular sieving adsorbent 4. The adsorption collector 5 separates the water being the adsorbable component from the mist component in the carrier gas, in an adsorption step of allowing the water, which is the adsorbable component contained in the mist component, to be in contact with and to be adsorbed into the molecular sieving adsorbent 4, and in a release step of releasing from the adsorbent 4 the water being the adsorbable component having been adsorbed into the molecular sieving adsorbent 4 in the (previous) adsorption step.

In the adsorption collector 5, the pressure in the release step is made lower than the pressure in the adsorption step, so that the water being the adsorbable component is separated from the mist component. That is to say, the adsorption collector 5 is so designed that the water being the adsorbable component is separated from the mist component by making the pressure at the time of releasing the adsorbed adsorbable component lower than the pressure at the time of adsorbing the adsorbable component.

The pressure in the release step is made lower than the pressure in the adsorption step, because the adsorbable amount by the molecular sieving adsorbent 4 is varied by the pressure. The characteristic that the molecular sieving adsorbent 4 adsorbs the water being the adsorbable component is varied depending on the kinds of the molecular sieving adsorbent 4 and the kinds of the adsorbable component, but it is a general tendency that, at the same temperature, when the pressure is increased, the adsorbable amount is increased as well, and when the pressure is decreased, the adsorbable amount is also decreased. At the same pressure as well, the adsorbable amount by the molecular sieving adsorbent 4 tends to be decreased at a lower temperature and to be increased at a higher temperature.

In the separating apparatus of the present invention, the above-described characteristic is utilized to separate the adsorbable component contained in the mist component and to collect the target substance such as alcohol of a higher concentration. That is to say, by making the pressure in the release step lower than the pressure in the adsorption step, a large amount of adsorbable component is adsorbed into the molecular sieving adsorbent 4 in the adsorption step, while a smaller amount of adsorbable component is made adsorbable into the molecular sieving adsorbent 4 in the release step, so that the adsorbable component is released from the molecular sieving adsorbent 4.

The adsorption collector 5 includes a sealed chamber 20 filled with the molecular sieving adsorbent 4, an on-off valve 21 for controlling a passage of the carrier gas flowed into or released from the sealed chamber 20, and a vacuum pump 22, connected to the sealed chamber 20, for evacuating the air from the sealed chamber 20.

The sealed chamber 20 is a closed chamber, and is filled with the molecular sieving adsorbent 4 inside. The molecular sieving adsorbent 4 is a molecular sieve made up of synthetic zeolite. The molecular sieve to be used is of such an effective pore size as may adsorb the water being the adsorbable component, for example, of the effective pore size of 3 angstroms. The molecular sieving adsorbent 4 is varied in its effective pore size depending on an adsorbable component. For example, a molecular sieve with an effective pore size of 5 angstroms adsorbs normal paraffin having a carbon number of more than three, but does not adsorb isoparaffin, benzene, toluene, or the like. Therefore, when a molecular serve with such an effective pore size is used, normal paraffin with a carbon number of more than three can be adsorbed to be separated from isoparaffin, benzene, toluene, or the like.

The sealed chamber 20 is connected through the transfer duct 9 to the outlet side of the cooling unit 19. When passing through the sealed chamber 20, the carrier gas containing the mist component flowed from the cooling unit 19 allows the adsorbable component to be adsorbed in the molecular sieving adsorbent 4. The sealed chamber 20 has its outlet side connected to the separation collector 6 and supplies to the separation collector 6 the carrier gas which has adsorbed the water being the adsorbable component.

Further, the sealed chamber 20 shown in FIG. 1 through FIG. 4 has its outlet side connected through the transfer duct 9 to the separation collector 6. The transfer ducts 9 connected to the inlet and outlet sides of the sealed chamber 20 are provided respectively with an on-off valve 21. In the adsorption collector 5, the carrier gas containing the mist component is supplied to the sealed chamber 20 when the on-off valve 21 is opened, and the mist component contained in the carrier gas is adsorbed into the molecular sieving adsorbent 4.

Further, the sealed chamber 20 is connected through the suction duct 23 to the inlet side of the vacuum pump 22. The suction duct 23 is provided with a suction valve 24. The vacuum pump 22 decompresses the sealed chamber 20 by forcible evacuating the air from the sealed chamber 20. When evacuation is applied, the molecular sieving adsorbent 4 releases the adsorbable component having been adsorbed. The vacuum pump 22 forcibly exhausts the adsorbable component having been released from the molecular sieving adsorbent 4. The apparatus shown in FIG. 1 and FIG. 3 has a cooler 25 connected to the outlet side of the vacuum pump 22. The cooler 25 cools the adsorbable component released from the molecular sieving adsorbent 4, dews or condenses to collect as the liquid water. Therefore, the cooler 25 serves to exhaust the water being the adsorbable component having been adsorbed into the molecular sieving adsorbent 4. However, as shown in FIG. 2 and FIG. 2, the cooler is not necessarily essential. This is because in the apparatus in which the adsorbable component is the water, the water being the adsorbable component released from the molecular sieving adsorbent can be disposed of.

In the separating apparatus shown in FIG. 3, the blower 8 is disposed between the cooling unit 19 and the adsorption collector 5. In this separating apparatus, the carrier gas circulated by the blower 8 is, in a pressurized state, supplied to the adsorption collector 5 and then to the separation collector 6. The blower 8 can supply, to the adsorption collector 5 and the separation collector 6, the carrier gas pressurized, for example, to be higher than the atmospheric pressure. The separating apparatus, in which the carrier gas supplied to the adsorption collector 5 and the separation collector 6 is put in a state of being pressurized, carries the advantage that the adsorption amount can be increased in the adsorption step. Therefore, the adsorbable component and the non-adsorbable component can be efficiently separated from the carrier gas. However, the adsorption collector 5 is also capable of controlling independently the on-off value 21, connected to the inlet side of the sealed chamber 20, and the on-off valve 21, connected to the outlet side of the sealed chamber 20, so that the pressure of the carrier gas supplied to the sealed chamber 20 may be adjusted. Furthermore, the separating apparatus does not necessarily require the supplied carrier gas to be higher in pressure than the atmospheric pressure, and the pressure of the carrier gas can also be made equal to the atmospheric pressure.

Further, the illustrated adsorption collector 5 includes a sealed chamber 20 in pair being composed of a first sealed chamber 20A and a second sealed chamber 20B. The adsorption collector 5 of such structure carries the advantage that the water being the adsorbable component can be efficiently separated by the sealed chamber 20 in pair while switching the sealed chamber 20 in pair to an adsorption step and to a release step. The adsorption collector 5 of this structure separates the adsorbable component from the carrier gas in the following operation.

(1) The on-off valve 21 for the first sealed chamber 20A is opened, and the on-off valve 21 for the second sealed chamber 20B and the suction valve 24 for the first sealed chamber 20A are closed. The carrier gas supplied from the cooling unit 19 in such a state is allowed to flow into the first sealed chamber 20A, and the water being the adsorbable component is adsorbed into the molecular sieving adsorbent 4 filled in the first sealed chamber 20A.

(2) The on-off valve 21 for the first sealed chamber 20A and the suction valve 24 for the second sealed chamber 20B are closed after a predetermined period of time, and the on-off valve 21 for the second sealed chamber 20B is opened. The carrier gas supplied from the cooling unit 19 in such a state is not allowed to flow into the first sealed chamber 20A but is allowed to flow into the second sealed chamber 20B, so that the water being the adsorbable component is adsorbed into the molecular sieving adsorbent 4 filled in the second sealed chamber 20B.

(3) The suction valve 24 for the first sealed chamber 20A is opened, and the air is evacuated from the first sealed chamber 20A by means of the vacuum pump 22. The first sealed chamber 20A is evacuated, so that the water being the adsorbable component is separated from the molecular sieving adsorbent 4.

(4) The water being the adsorbable component having been separated from the molecular sieving adsorbent 4 in the first sealed chamber 20A is exhausted from the first sealed chamber 20A to flow into the cooler 25, cooled and dewed by the cooler 25, and condensed for collection. The adsorbable component can also be exhausted from the vacuum pump to the outside, without being cooled by the cooler.

(5) Further, after a predetermined period of time, the on-off valve 21 for the first sealed chamber 20A is opened, and the on-off valve 21 for the second sealed chamber 20B and the suction valve 24 for the first sealed chamber 20A are closed. The carrier gas supplied from the cooling unit 19 in such a state is not allowed to flow into the second sealed chamber 20B but is allowed to flow into the first sealed chamber 20A, so that the water being the adsorbable component is adsorbed into the molecular sieving adsorbent 4 filled in the first sealed chamber 20A.

(6) The suction valve 24 for the second sealed chamber 20B is opened, and the air is evacuated from the second sealed chamber 20B by means of the vacuum pump 22. The second sealed chamber 20B is evacuated, so that the water being the adsorbable component is separated from the molecular sieving adsorbent 4.

(7) The adsorbable component having been separated from the molecular sieving adsorbent 4 in the second sealed chamber 20B is exhausted from the second sealed chamber 20B to flow into the cooler 25, cooled by the cooler 25, and condensed and aggregated for collection. This adsorbable component can also be exhausted from the vacuum pump to the outside.

(8) After the steps (2) to (7) are repeated, namely by alternately opening and closing the on-off valve 21, the adsorbable component is separated from the mist component in the sealed chamber 20 in pair.

Further, the adsorption collector 5 can collect the adsorbable component in the carrier gas more efficiently by making the temperature of molecular sieving adsorbent 4 in the adsorption step lower than the temperature of molecular sieving adsorbent 4 in the release step. This is because, as described above, the adsorption amount by the molecular sieving adsorbent 4 is varied depending on the temperature as well. The adsorption collector 5 can increase the adsorption amount by cooling the molecular sieving adsorbent 4, for example, in the adsorption step.

In the collection unit 3 shown in FIG. 1 and FIG. 3, the carrier gas and the mist component are cooled by the cooling unit 19 and supplied to the adsorption collector 5. In the apparatus, the adsorption amount of the adsorbable component in the adsorption step increases, and a large amount of adsorbable component contained in the mist component is adsorbed. However, the collection unit does not necessarily have to be provided with a cooling unit, and the carrier gas containing the mist component can also be supplied to the adsorption collector, without being cooled by the cooling unit.

Further, in the adsorption collector 5, the molecular sieving adsorbent 4 can also be heated in the release step. Since an amount of adsorbable component to be adsorbed is reduced in such heated molecular sieving adsorbent 4, the adsorbable component having been adsorbed can be efficiently separated. Although not shown, the adsorption collector is provided with a temperature controller for heating the molecular sieving adsorbent. The temperature controller is a heating system for example, and is disposed inside the sealed chamber to heat the molecular adsorbent. A heating heat exchanger or a heating element can be used in the heating system.

Further, the adsorption collector 5 shown in FIG. 2 and FIG. 4 is provided with a temperature controller 26 for controlling a temperature of the molecular sieving adsorbent 4 filled in the sealed chamber 20. The temperature controller 26 is so structured that the molecular sieving adsorbent 4 filled in the sealed chamber 20 can be cooled and heated.

FIG. 6 shows the temperature controller 26. The illustrated temperature controller 26 includes a heat exchanger 27 disposed in the respective sealed chambers 20, a warming-up mechanism 28 for circulating warm water to the heat exchanger 27 in first sealed chambers 20, a cooling-down mechanism 29 for circulating cool water to second sealed chambers 20, a control valve 30 for switching the warm water and the cool water to be circulated to the respective sealed chambers 20, and a refrigeration cycle system 33 for heating a warm water tank 31 for the warming-up mechanism 28 as well as cooling a cool water tank 32 for the cooling-down mechanism 29.

The heat exchanger 27 is disposed inside the sealed chamber 20. In the heat exchanger 27, the molecular sieving adsorbent 4 is warmed in a state that the warm water is circulated inside, and the molecular sieving adsorbent 4 is cooled in a state that the cool water is circulated inside. The warming-up mechanism 28 has a radiator 34 of the refrigeration cycle system 33 disposed inside the warm water tank 31, so that the warm water warmed up by the radiator 34 is circulated through the circulation circuit to warm up the sealed chamber 20. The cooling-down mechanism 29 has a heat sink 35 of the refrigeration cycle system 33 disposed inside the cool water tank 32, so that the cool water cooled down by the heat sink 35 is circulated through the circulation circuit to cool down the sealed chamber 20. However, the warming-up mechanism and the cooling-down mechanism can also circulate a coolant other than water.

The refrigeration cycle system 33 includes a compressor 36 for pressurizing a vaporized coolant, a radiator 34 for liquefying the coolant pressurized by the compressor 36, a heat sink 35 to be forcibly cooled down by means of the heat of vaporization generated by the liquefied coolant, and an expansion valve 37 connected between the radiator 34 and the heat sink 35. The expansion valve 37 adiabatically expands the coolant pressurized and cooled to be liquefied inside the heat sink 35, so that the heat sink 35 is forcibly cooled by means of the heat of vaporization of the coolant. In the refrigeration cycle system 33, an aperture of the expansion valve 37 and the output of the compressor 36 are adjusted to set the temperatures of the radiator 34 and the heat sink 35 at predetermined temperatures.

In the temperature controller 26 of the above-described structure, the control valve 30 is switched to warm with the warm water circulated to the heat exchanger 27 of the first sealed chamber 20 and to cool with the cool water circulated to the heat exchanger 27 of the second sealed chamber 20. The temperature controller 26 of this structure is capable of warming and cooling the sealed chamber 20 in pair by a single refrigeration cycle system 33, so that the molecular sieving adsorbent 4 filled in the sealed chamber 20 in pair can be subjected to an efficient temperature control. In the adsorption collector 5 provided with the sealed chamber 20 in pair, when the first sealed chamber 20 is in an adsorption step, the second sealed chamber 20 is in a release step. Therefore, in this temperature controller 26, the sealed chamber 20 in an adsorption step can be cooled to efficiently adsorb the adsorbable component into the molecular sieving adsorbent 4, while the sealed chamber 20 in a release step can be warmed to efficiently separate the adsorbable component which is adsorbed into the molecular sieving adsorbent 4.

In the separation collector 6, the mist component with a higher concentration of alcohol being the non-adsorbable component is collected after separating the water being the adsorbable component at the adsorption collector 5. In the separation collector 6, the alcohol being the non-adsorbable component is separated by being adsorbed into a second adsorbent 7. In the separation collector 6, the alcohol being the non-adsorbable component is separated from the mist component in the carrier gas, in the adsorption step that the alcohol being the non-adsorbable component which is contained in the mist component is allowed to contact the second adsorbent 7 for adsorption, and in the release step that the alcohol being the non-adsorbable component which is adsorbed into the second adsorbent 7 in the adsorption step is released from the second adsorbent 7.

In the separation collector 6, like in the adsorption collector 5, the alcohol being the non-adsorbable component is separated from the mist component by making the pressure in the release step lower than the pressure in the adsorption step.

The pressure in the release step is made lower than the pressure in the adsorption step, because the adsorption amount by the second adsorbent 7, like the molecular sieving adsorbent 4, is varied depending on a pressure. Under the same pressure, the adsorption amount by the second adsorbent 7 as well tends to be decreased at a lower temperature and increased at a higher temperature.

The second adsorbent 7 in the separation collector 6 adsorbs the non-adsorbable component contained in the mist component and collects the target substance such as a higher concentration of alcohol. That is to say, when the pressure in the release step is made lower than the pressure in the adsorption step, a large amount of non-adsorbable component is adsorbed into the second adsorbent 7 in the adsorption step, and an amount of non-adsorbable component which can be adsorbed in the second adsorbent 7 in the release step is made smaller, so that the non-adsorbable component is released from the second adsorbent 7.

The separation collector 6, like the adsorption collector 5, includes a sealed chamber 40 filled with the second adsorbent 7, an on-off valve 41 for controlling the passage of the carrier gas flowed into or exhausted from the sealed chamber 40, and a vacuum pump 42, connected to the sealed chamber 40, for evacuating the air from the sealed chamber 40.

The sealed chamber 40 is a blocked chamber and is filled with the second adsorbent 7 inside. The second adsorbent 7 is a molecular sieve made up of synthetic zeolite which adsorbs the alcohol being the non-adsorbable component which is not adsorbed into the molecular sieving adsorbent 4. The molecular sieve to be used is of such an effective pore size as may adsorb alcohol being the non-adsorbable component, for example, of the effective pore size of 5 angstroms. The second adsorbent 7 can also be used of any such material as may adsorb the mist component from which the adsorbable component is separated in the molecular sieve adsorbent 4, for example, any one of zeolite, activated charcoal, lithium oxide, silica gel, or a mixture of these materials.

The sealed chamber 40 is connected through the transfer duct 9 to the outlet side of the adsorption collector 5. Further, in the apparatus shown in FIG. 1 and FIG. 3, the sealed chamber 40 in the separation collector 6 is connected through the cooling unit 47 to the adsorption collector 5. In the separation collector 6, the alcohol being the non-adsorbable component is adsorbed into the second adsorbent 7 and separated from the carrier gas cooled by the cooling unit 47.

Further, the sealed chamber 40 shown in FIG. 2 through FIG. 4 has its outlet side connected through the transfer duct 9 to the atomization chamber 1, while the sealed chamber 40 shown in FIG. 1 has its outlet side for the carrier gas opened to the atmosphere. The transfer duct 9 connected to the inlet and outlet sides of the sealed chamber 40 is provided with the on-off valve 41. The separation collector 6 is so constructed and arranged that the carrier gas containing the mist component is supplied to the sealed chamber 40 when the on-off valve 41 is opened, and the non-adsorbable component in the mist component contained in the carrier gas is adsorbed into the second adsorbent 7.

Further, the sealed chamber 40 is connected through the suction duct 43 to the inlet side of the vacuum pump 42. The suction duct 43 is provided with the suction valve 44. The vacuum pump 42 serves to forcibly evacuate the air from the sealed chamber 40 to decompress the sealed chamber 40. When the chamber is evacuated, the second adsorbent 7 releases the non-adsorbable component which has been adsorbed. The vacuum pump 42 forcibly exhausts the non-adsorbable component released from the second adsorbent 7. The illustrated apparatus has a cooler 45 connected to the outlet side of the vacuum pump 42.

The cooler 45 cools the non-adsorbable component released from the second adsorbent 7, dews or condenses the component to collect highly concentrated alcohol. Therefore, the highly concentrated alcohol being the non-adsorbable component having been adsorbed into the second adsorbent 7 is exhausted from the cooler 45.

As indicated by the chained line in FIG. 3, the separating apparatus can have the blower 8 connected between the adsorption collector 5 and the separation collector 6. The blower 8 serves to supply the carrier gas exhausted from the adsorption collector 5 to the separation collector 6 in a pressurized state. The blower 8 supplies a highly pressurized carrier gas, for example, to the separation collector 6, so that the adsorption amount of the non-adsorbable component can be increased in the adsorption step. However, the separating apparatus does not necessarily have to have the blower connected between the adsorption collector and the separation collector.

Further, the illustrated separation collector 6, like the adsorption collector 5, includes a sealed chamber 40 in pair which is composed of a first sealed chamber 40A and a second sealed chamber 40B. The separation collector 6 of such a structure carries the advantage that the alcohol being the non-adsorbable component can be efficiently separated while the sealed chamber 40 in pair is being switched into the adsorption step or into the release step.

The separation collector 6 of this structure separates the non-adsorbable component from the carrier gas in the following operation.

(1) The on-off valve 41 for the first sealed chamber 40A is opened, and the on-off valve 41 for the second sealed chamber 40B and the suction valve 40 for the first sealed chamber 40A is closed. The carrier gas supplied from the adsorption collector 5 in such a state is allowed to flow into the first sealed chamber 40A, and the alcohol being the non-adsorbable component is adsorbed in the second adsorbent 7 filled in the first sealed chamber 40A.

(2) After a predetermined period of time, the on-off valve 41 for the first sealed chamber 40A and the suction valve 44 for the second sealed chamber 40B are closed, and the on-off valve 41 for the second sealed chamber 40B is opened. The carrier gas supplied from the cooling unit 19 in such a state does not flow into the first sealed chamber 40A but flows into the second sealed chamber 40B, so that the alcohol being the non-adsorbable component is adsorbed into the second adsorbent 7 which is filled in the second sealed chamber 40B.

(3) The suction valve 44 for the first sealed chamber 40A is opened, and the air is evacuated from the first sealed chamber 40A by means of the vacuum pump 42. The first sealed chamber 40A is evacuated, and the alcohol being the non-adsorbable component is separated from the second adsorbent 7.

(4) The alcohol being the non-adsorbable component which is separated from the second adsorbent 7 in the first sealed chamber 40A is released from the first sealed chamber 40A to flow into the cooler 45, and is cooled by the cooler 45, condensed and aggregated to be collected as highly concentrated alcohol after condensation.

(5) Further, after a predetermined period of time, the on-off valve 41 for the first sealed chamber 40A is opened, and the on-off valve 41 for the second sealed chamber 40B and the suction valve 44 for the first sealed chamber 40A are closed. The carrier gas supplied from the cooling unit 19 in such a state does not flow into the second sealed chamber 40B but flows into the first sealed chamber 40A, so that the alcohol being the non-adsorbable component is adsorbed into the second adsorbent 7 which is filled in the first sealed chamber 40A.

(6) The suction valve 44 for the second sealed chamber 40B is opened to evacuate the air from the second sealed chamber 40B by means of the vacuum pump 42. The second sealed chamber 40B is evacuated to separate, in a highly concentrated state, the alcohol being the non-adsorbable component from the second adsorbent 7.

(7) The non-adsorbable component separated from the second adsorbent 7 in the second sealed chamber 40B is released from the second sealed chamber 40B and flows into the cooler 45 to be cooled by the cooler 45, and condensed and aggregated for collection after condensation.

(8) The steps (2) through (7) are repeated, that is, the on-off valve 41 is alternately opened or closed to separate highly concentrated alcohol being the non-adsorbable component from the mist component in the sealed chamber 40 in pair.

Further, the separation collector 6, like the adsorption collector 5, can collect the non-adsorbable component of the carrier gas more efficiently by making the temperature of the second adsorbent 7 in the adsorption step lower than the temperature of the second adsorbent 7 in the release step.

In the collection unit 3 shown in FIG. 1 and FIG. 3, the carrier gas and the mist component are cooled by the cooling unit 47 and supplied to the separation collector 6. In this apparatus, the adsorption amount of non-adsorbable component increases in the separation step, and a large amount of non-adsorbable component contained in the mist component is adsorbed. However, the collection unit does not necessarily have to be provided with such a cooling unit, and the carrier gas containing the mist component can also be supplied to the separation collector, without cooling the carrier gas containing the mist component.

Further, the separation collector, like the adsorption collector, can efficiently separate the non-adsorbable component having been adsorbed, when the second adsorbent is warmed in the release step. The separation collector warms the second adsorbent by means of the temperature controller. The temperature controller, being a heater for example, is disposed inside the sealed chamber to warm the second adsorbent. The heater to be used can be of the heating heat exchanger or the heating element.

Further, the separation collector 6 shown in FIG. 2 and FIG. 4, like the adsorption collector 5, is provided with a temperature controller 46 for controlling the temperature of the second adsorbent 7 filled in the sealed chamber 40. The temperature controller 46, being of the same structure as the temperature controller 26 for the adsorption collector 5 shown in FIG. 6, can cool and warm the second adsorbent 7 filled in the sealed chamber 40.

Further, the separation collector 6 in which the temperature controller 46 warms the second adsorbent 7 carries the advantage that the carrier gas circulated from the separation collector 6 to the atomization chamber 1 is warmed to generate the mists efficiently in the atomization chamber 1. The extent that the solution is atomized into the mists in the atomization chamber 1 varies in accordance with the temperatures of the solution and the carrier gas, and accordingly when the temperatures of the carrier gas and the solution increase, the amount of the mists to be generated increases as well. The temperature controller 46 warms the carrier gas at the range of 25-30° C. However, the temperature controller 46 can also warm the carrier gas at the range of 15-40° C. to supply the carrier gas to the atomization chamber 1. When the temperature of the carrier gas supplied to the atomization chamber 1 increases, the amount of the mists to be generated will increase, but when the temperature is excessively high, the target substance such as the alcohol will be deteriorated in its quality. Conversely, when the temperature is too low, the efficiency of obtaining the target substance in the mists tends to be decreased.

INDUSTRIAL APPLICABILITY

The solution separating apparatus of the present invention can be advantageously be used for applications such as when separating a highly concentrated alcohol from the alcohol solution such as biomass alcohol, Sake and Sake raw materials.

DESCRIPTION OF THE NUMERALS

Figure 1:
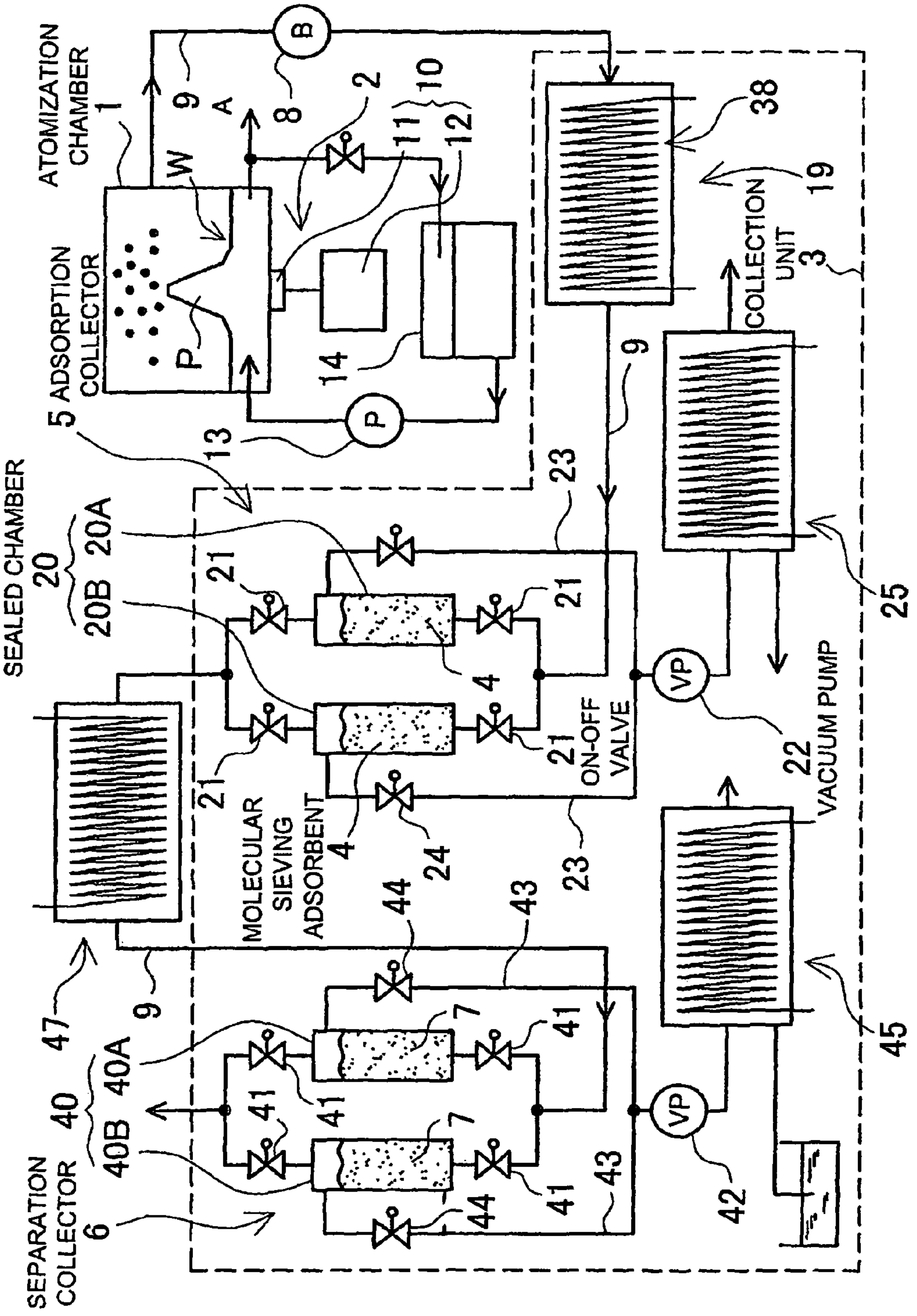
FIG. 1 is a block schematic diagram showing the solution separating apparatus in accordance with an embodiment of the present invention.
Figure 2:
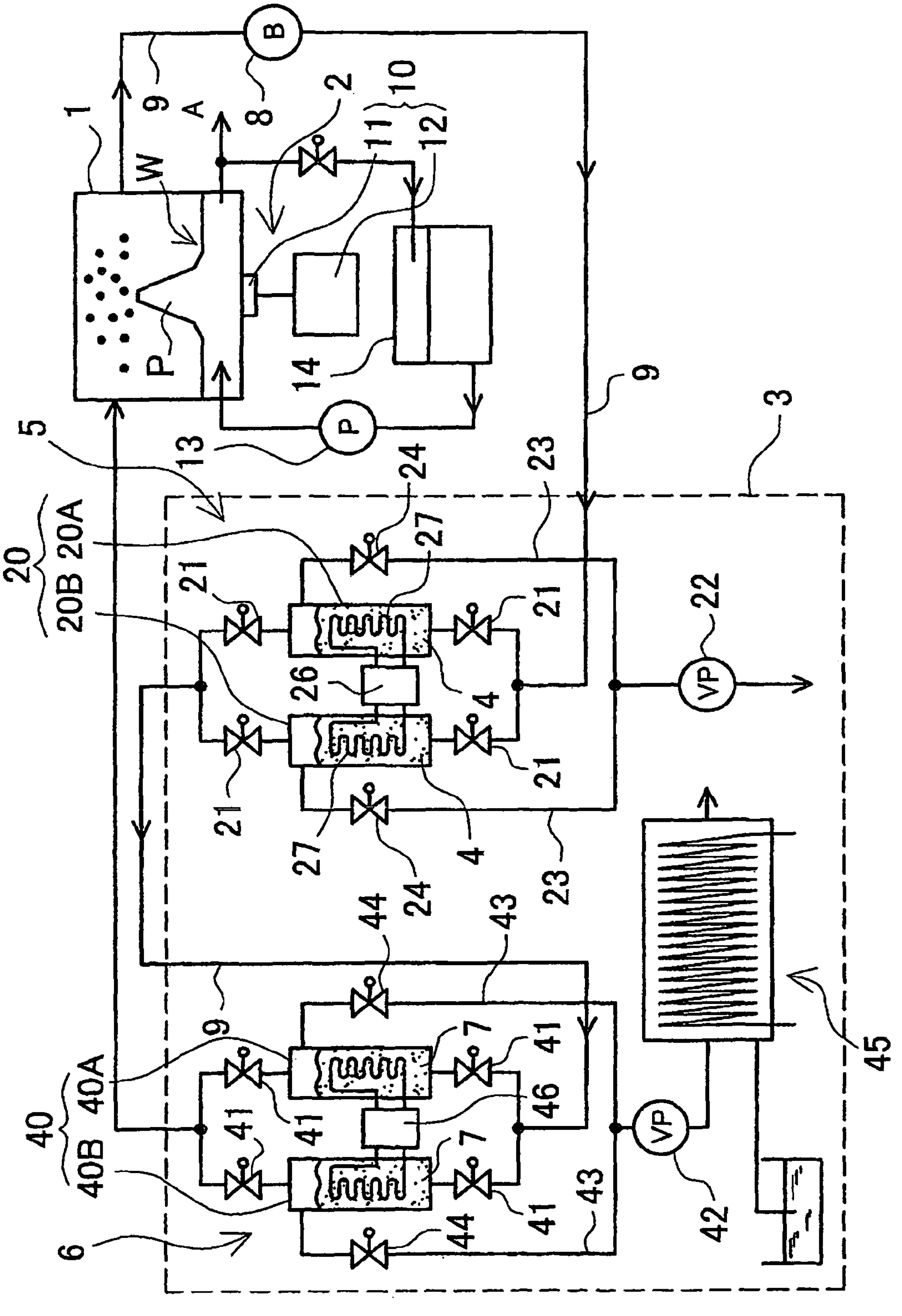
FIG. 2 is a block schematic diagram showing the solution separating apparatus in accordance with another embodiment of the present invention.
Figure 3:
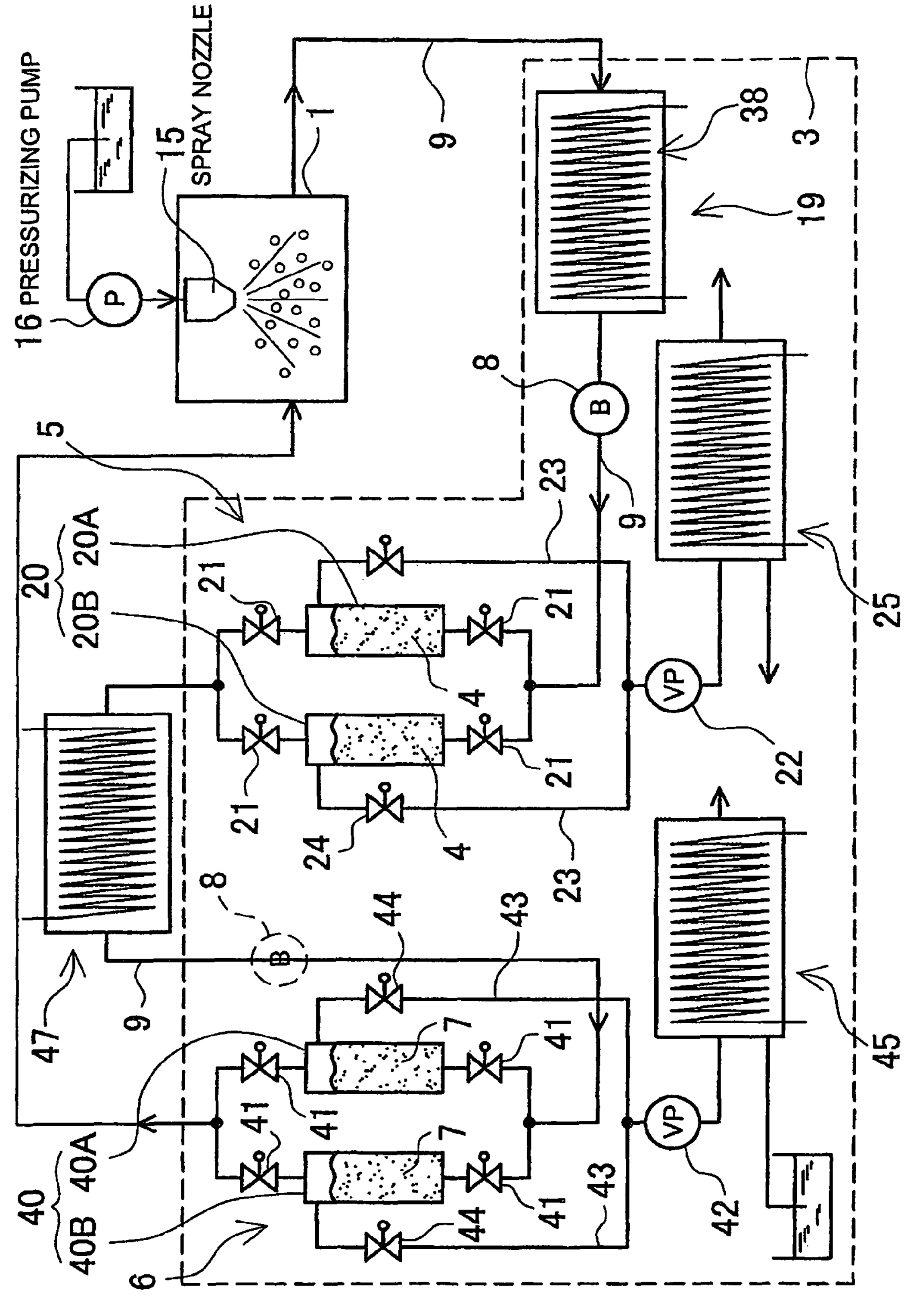
FIG. 3 is a block schematic diagram showing the solution separating apparatus in accordance with yet another embodiment of the present invention.
Figure 4:
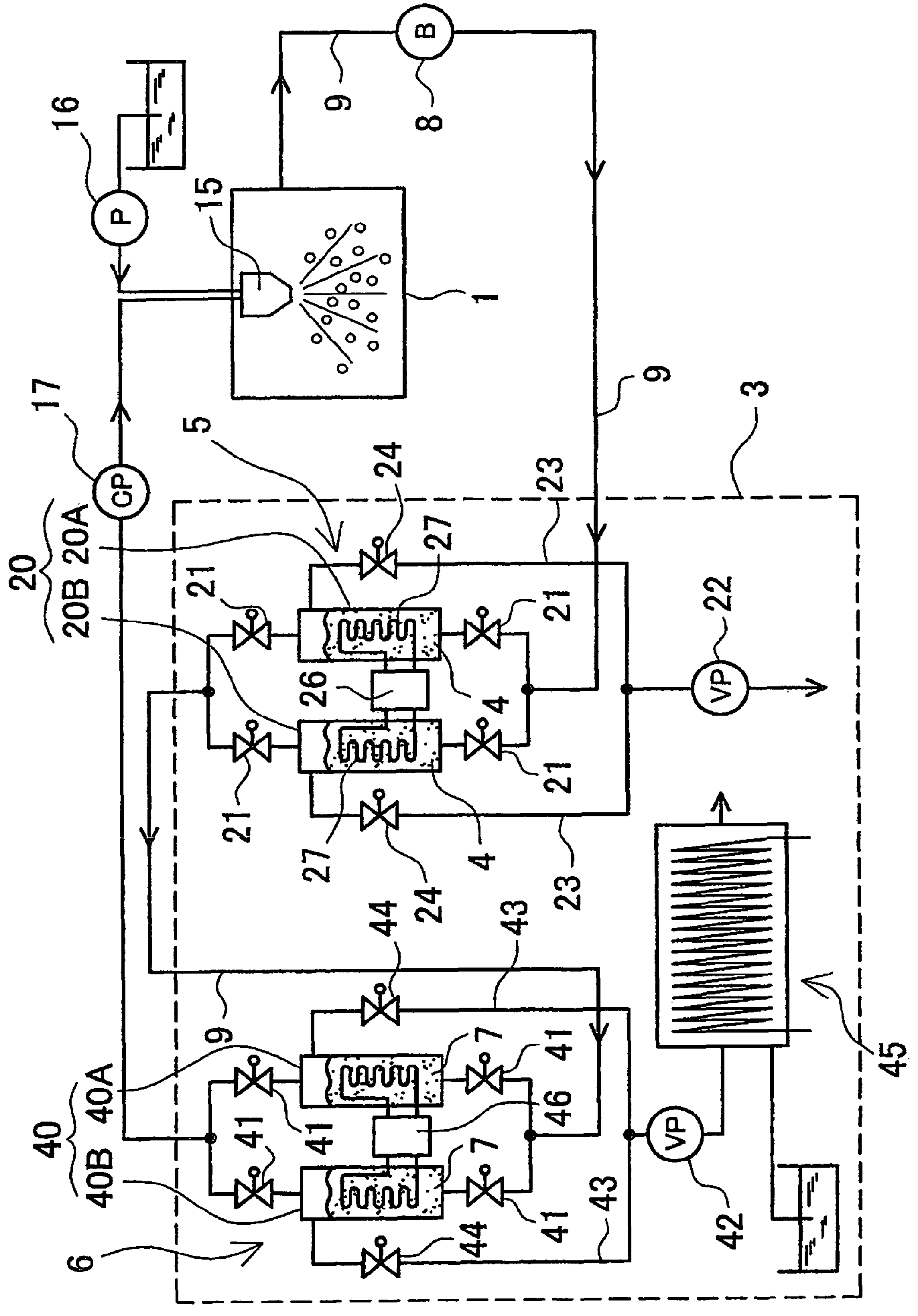
FIG. 4 is a block schematic diagram showing the solution separating apparatus in accordance with a further embodiment of the present invention.
Figure 5:
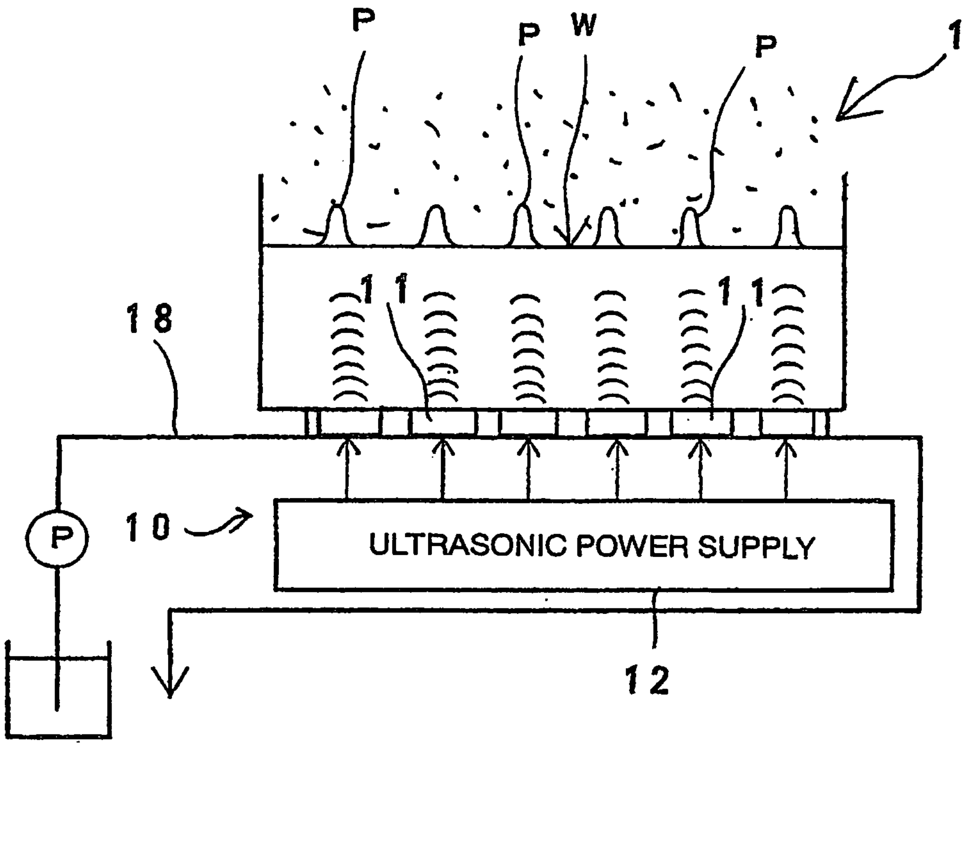
FIG. 5 is a block schematic diagram showing an example of the atomization chamber and the ultrasonic atomizer.
Figure 6:
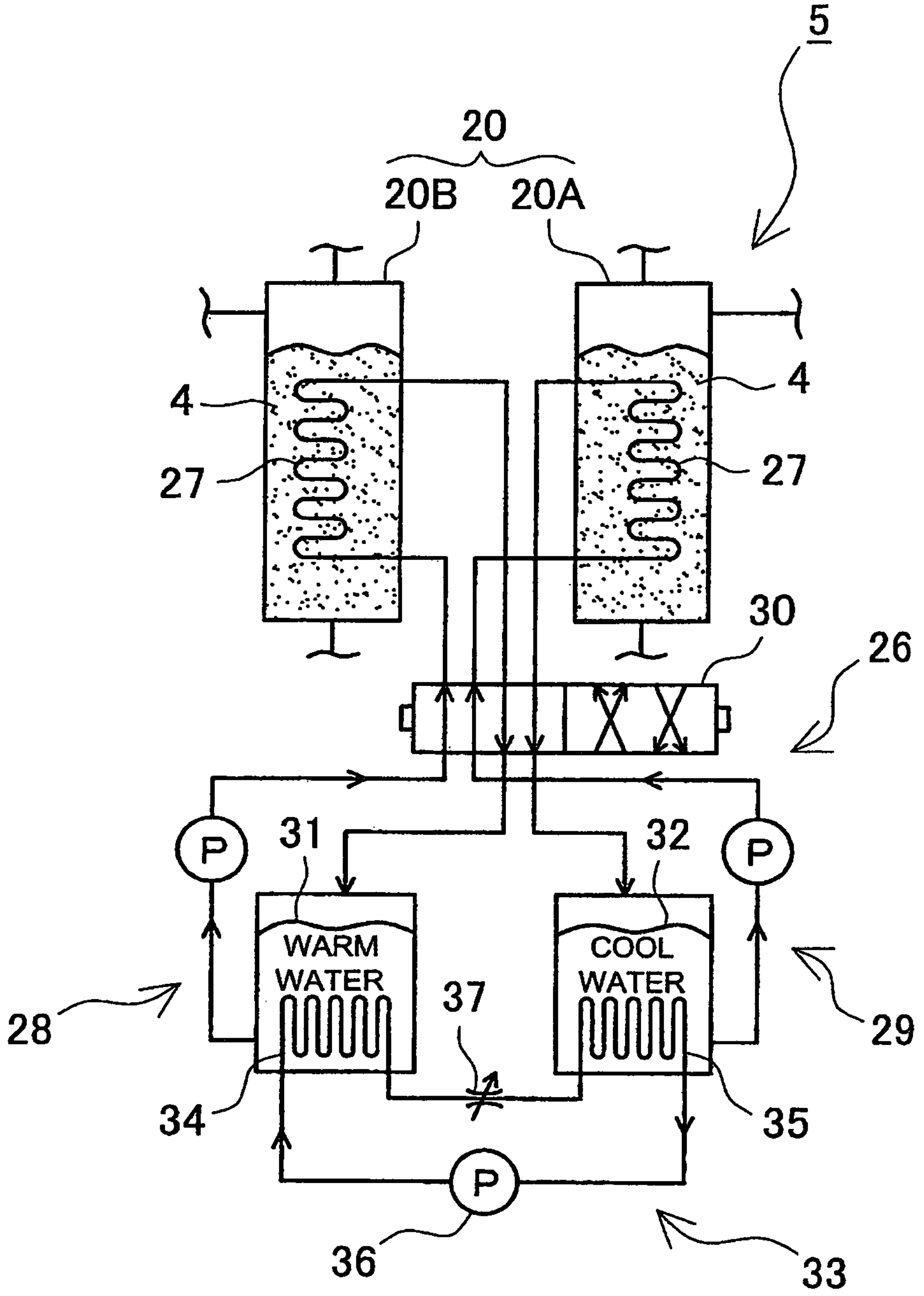
FIG. 6 is a block schematic diagram showing an example of the temperature controller.
Figure 7:
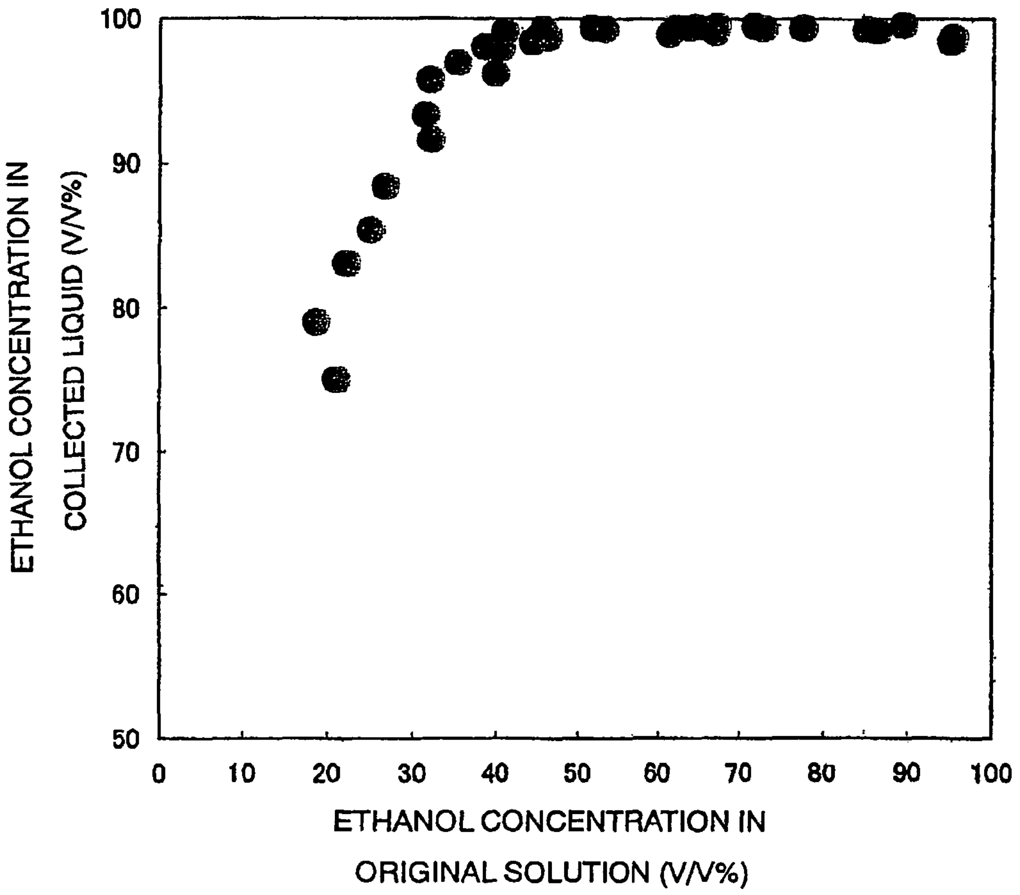
FIG. 7 is a graph showing that the solution separating apparatus transforms the alcohol solution into a high concentration.

1 . . . Atomization Chamber
2 . . . Atomization Mechanism
3 . . . Collection Unit
4 . . . Molecular Sieving Adsorbent
5 . . . Adsorption Collector
6 . . . Separation Collector
7 . . . Second Adsorbent
8 . . . Blower
9 . . . Transfer Duct
10 . . . Ultrasonic Atomizer
11 . . . Ultrasonic Vibrator
12 . . . Ultrasonic Power Supply
13 . . . Pump
14 . . . Starting Solution Tank
15 . . . Spray Nozzle
16 . . . Pressurizing Pump
17 . . . Compressing Unit
18 . . . Cooling Pipe
19 . . . Cooling Unit
20 . . . Sealed Chamber
20A . . . First Sealed Chamber
20B . . . Second Sealed Chamber
21 . . . On-Off Valve
22 . . . Vacuum Pump
23 . . . Suction Duct
24 . . . Suction Valve
25 . . . Cooler
26 . . . Temperature Controller
27 . . . Heat Exchanger
28 . . . Warming-up Mechanism
29 . . . Cooling-down Mechanism
30 . . . Control Valve
31 . . . Warm Water Tank
32 . . . Cool Water Tank
33 . . . Refrigeration Cycle System
34 . . . Radiator
35 . . . Heat Sink
36 . . . Compressor
37 . . . Expansion Valve
38 . . . Cooler
40 . . . Sealed Chamber
40A . . . First Sealed Chamber
40B . . . Second Sealed Chamber
41 . . . On-Off Valve
42 . . . Vacuum Pump
43 . . . Suction Duct
44 . . . Suction Valve
45 . . . Cooler
46 . . . Temperature Controller
47 . . . Cooling Unit
W . . . Solution Surface
P . . . Liquid Column

The invention claimed is:

1. A solution separating apparatus comprising:

an atomization chamber for atomizing a solution into a carrier gas;

an atomization mechanism for atomizing the solution into mist components to be mixed with the carrier gas within the atomization chamber; and a collection unit which adsorbs and separates a mist component from the carrier gas, the mist component being atomized by the atomization mechanism and transferred by the carrier gas, wherein the collection unit comprises a cooling unit that condenses and collects the mist contained in the carrier gas, an adsorption collector with a molecular sieving adsorbent provided on an outlet side of the cooling unit, the adsorption collector having a temperature controller which has a first heat exchanger that cools the molecular sieving adsorbent to cause adsorption of a first component contained in the mist components within the carrier gas into the molecular sieving adsorbent, and having a second heat exchanger that heats the molecular sieving adsorbent to cause release of the first component from the molecular sieving adsorbent and separating the first component from another mist component, and a separation collector provided on an outlet side of the absorption collector, the separation collector adsorbing and separating a second component which is contained in the mist components within the carrier gas and is not adsorbed by the adsorption collector.

2. The solution separating apparatus as recited in claim 1, wherein the atomization mechanism comprises an ultrasonic vibrator for ultrasonically vibrating the solution in the atomization chamber to be atomized into the mists to be mixed with the carrier gas for dispersion, and an ultrasonic power supply, connected to the ultrasonic vibrator, for supplying high-frequency electric power to the ultrasonic vibrator to generate an ultrasonic vibration.

3. The solution separating apparatus as recited in claim 1, wherein the atomization mechanism comprises a spray nozzle for spraying the solution into the mists within the atomization chamber, and a pressurizing pump for pressuring and supplying the solution to the spray nozzle.

4. The solution separating apparatus as recited in claim 1, wherein the molecular sieving adsorbent for adsorbing the adsorbable component is a molecular sieve made up of synthetic zeolite.

5. The solution separating apparatus as recited in claim 1, wherein the solution is an alcohol solution, and the molecular sieving adsorbent at the adsorption collector is a molecular sieve for adsorbing water, contained in the mist components, as an adsorbable component.

6. The solution separating apparatus as recited in claim 1, wherein the separation collector comprises a second adsorbent, and wherein the second adsorbent adsorbs and separates a non-adsorbable component contained in the mist components by the molecular sieving adsorbent at the adsorption collector.

7. The solution separating apparatus as recited in claim 6, wherein the solution is an alcohol solution, the molecular sieving adsorbent at the adsorption collector is a molecular sieve for adsorbing water, contained in the mist components, as an adsorbable component, and the second adsorbent at the separation collector serves as an adsorbent for adsorbing the alcohol.

8. The solution separating apparatus as recited in claim 1, wherein the adsorption collector has the molecular sieving adsorbent filled in a sealed chamber, and further a vacuum pump is connected to the sealed chamber so that the vacuum pump evacuates the sealed chamber to release the adsorbable component from the molecular sieving adsorbent.

9. The solution separating apparatus as recited in claim 8, wherein the sealed chamber is connected via an on-off valve to the atomization chamber, and when the on-off valve is opened, the carrier gas containing the mist component is supplied from the atomization chamber to the sealed chamber to allow the adsorbable component to be adsorbed into the molecular sieving adsorbent, and when the on-off valve is closed to evacuate the sealed chamber, the mist component is released from the molecular sieving adsorbent.

10. The solution separating apparatus as recited in claim 9, wherein a pair of sealed chambers are filled with a molecular sieving adsorbent, and the pair of sealed chambers are connected via the on-off valves to the atomization chamber, and wherein one of the on-off valves is opened to supply the carrier gas, containing the mist component, to the sealed chamber to allow the adsorbable component to be adsorbed into the molecular sieving adsorbent, while the other of the on-off valves is closed to evacuate the sealed chamber to release the adsorbable component from the molecular sieving adsorbent, so that the on-off valves are alternately opened and closed to allow the adsorbable component to be separated from the carrier gas.

11. The solution separating apparatus as recited in claim 6, wherein the separation collector comprises a sealed chamber filled with the second adsorbent, and wherein the sealed chamber is connected to the atomization chamber through a transfer duct at an outlet side of the sealed chamber.

* * * * *